US009143277B2

(12) United States Patent
Becker et al.

(10) Patent No.: US 9,143,277 B2
(45) Date of Patent: *Sep. 22, 2015

(54) APPARATUS AND METHOD FOR SUPPORT OF COMMUNICATIONS SERVICES AND APPLICATIONS OVER RELATIVELY LOW SIGNAL-TO-NOISE RATIO LINKS

(71) Applicant: Hughes Network Systems, LLC, Germantown, MD (US)

(72) Inventors: Neal Becker, Frederick, MD (US); Lin-Nan Lee, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/589,908

(22) Filed: Jan. 5, 2015

(65) Prior Publication Data

US 2015/0117469 A1    Apr. 30, 2015

Related U.S. Application Data

(63) Continuation of application No. 13/763,731, filed on Feb. 10, 2013, now Pat. No. 8,929,400.

(51) Int. Cl.
*H04J 3/06* (2006.01)
*H04L 1/00* (2006.01)
*H04B 7/185* (2006.01)
*H04H 20/74* (2008.01)
(Continued)

(52) U.S. Cl.
CPC .......... *H04L 1/0084* (2013.01); *H04B 7/18523* (2013.01); *H04H 20/74* (2013.01); *H04L 1/0005* (2013.01); *H04L 1/0011* (2013.01); *H04L 1/0028* (2013.01); *H04L 29/06523* (2013.01); *H04W 56/003* (2013.01); *H04W 56/00* (2013.01)

(58) Field of Classification Search
None
See application file for complete search history.

(56) References Cited

U.S. PATENT DOCUMENTS 4,398,291 A    8/1983  Hotta et al.
5,581,688 A   12/1996  Jiang et al.
5,805,822 A    9/1998  Long et al.
(Continued)

FOREIGN PATENT DOCUMENTS

WO    WO0010301    2/2000

OTHER PUBLICATIONS

EPO, "Extended European Search Report", EPO Application No. 14168480.3.
(Continued)

*Primary Examiner* — Bob Phunkulh
(74) *Attorney, Agent, or Firm* — Potomac Technology Law, LLC

(57) ABSTRACT

A physical layer (PL) frame generation method is provided. A PL payload is generated by encoding and modulating source data based on a first modcod of a first set. A synchronization header, comprising a first unique word (UW) (designed to facilitate efficient and reliable detection by terminals of a relatively low SNR operating range), and a modcod field (which indicates the first modcod scheme), is appended to the PL payload. A PL header is appended to the synchronization header and PL payload to form the PL frame. The PL header comprises a second UW and physical layer signaling (PLS). The PLS comprises encoded data fields reflecting a length of the PL frame, where the fields are encoded based on a second modcod scheme of a second set. The first modcod set is designed for SNR operating levels relatively lower than the SNR operating levels of the second modcod set.

20 Claims, 11 Drawing Sheets

(51) Int. Cl.
*H04L 29/06* (2006.01)
*H04W 56/00* (2009.01)

(56) References Cited

U.S. PATENT DOCUMENTS

| | | |
|---|---|---|
| 6,522,665 B1 | 2/2003 | Suzuki et al. |
| 7,436,896 B2 | 10/2008 | Hottinen |
| 7,706,315 B2 | 4/2010 | Vanderaar et al. |
| 7,715,786 B2 | 5/2010 | Santoru et al. |
| 8,208,499 B2 | 6/2012 | Sun et al. |
| 2004/0252725 A1 | 12/2004 | Sun et al. |
| 2007/0206638 A1 | 9/2007 | Santoru et al. |
| 2007/0208884 A1 | 9/2007 | Vanderaar et al. |
| 2009/0022085 A1* | 1/2009 | Dankberg et al. ............. 370/316 |
| 2009/0034654 A1 | 2/2009 | Inukai et al. |
| 2009/0279475 A1 | 11/2009 | Vanderaar et al. |
| 2010/0150053 A1* | 6/2010 | Becker et al. ................. 370/316 |
| 2010/0150054 A1* | 6/2010 | Becker et al. ................. 370/316 |
| 2010/0157931 A1 | 6/2010 | Vanderaar et al. |
| 2013/0223320 A1* | 8/2013 | Becker et al. ................. 370/312 |

OTHER PUBLICATIONS

Hughes Network Systems, "Evolutionary DVB-S2 Proposal", DVB, XP017840344, Feb. 17, 2013.
Motorola, "Transport Block Size and MCS Signaling for E-UTRA", 3Gpp TSG RAN1 #51, Nov. 5, 2007.
Panasonic, "Transport Format Signaling and Padding Overhead", 3GPP TSG-RAN WG1 Meeting #50b, Oct. 8, 2007.

* cited by examiner

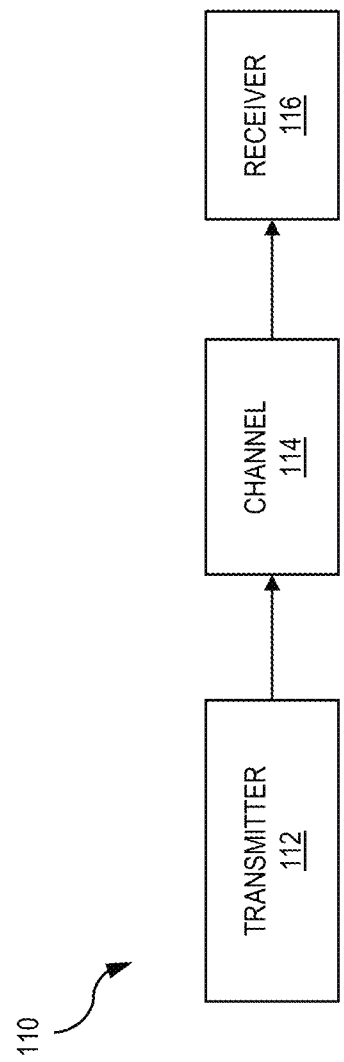

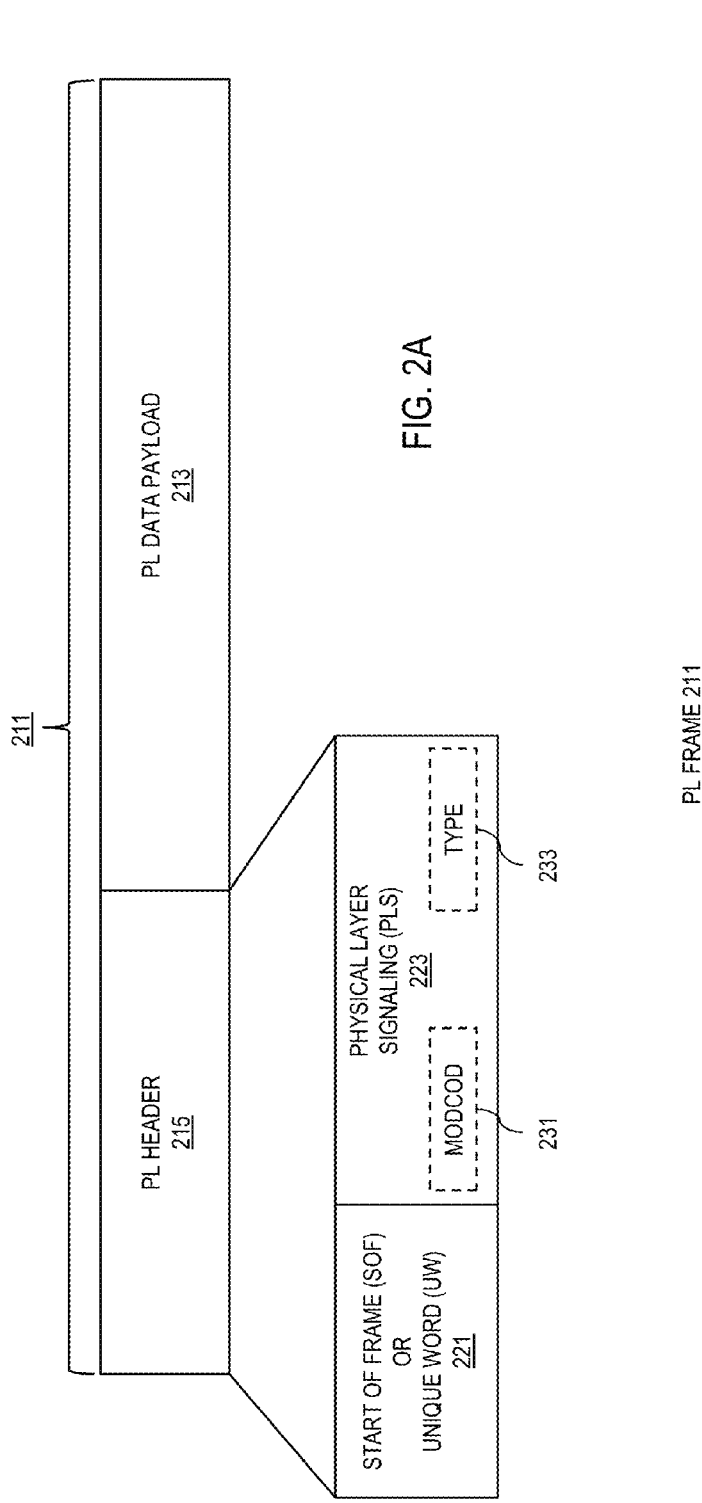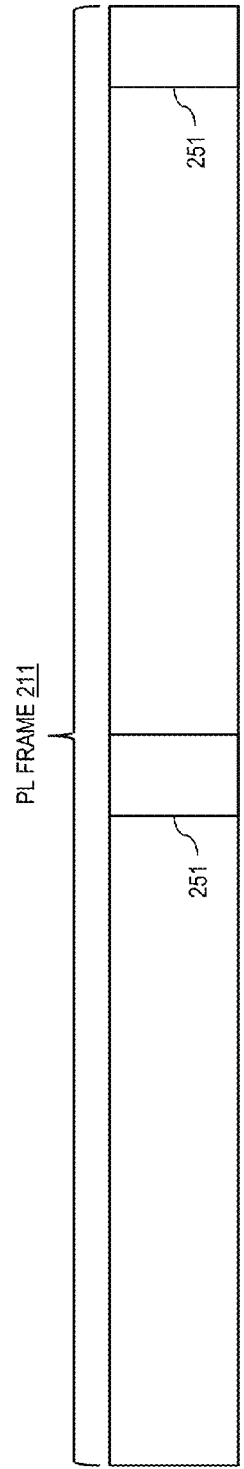

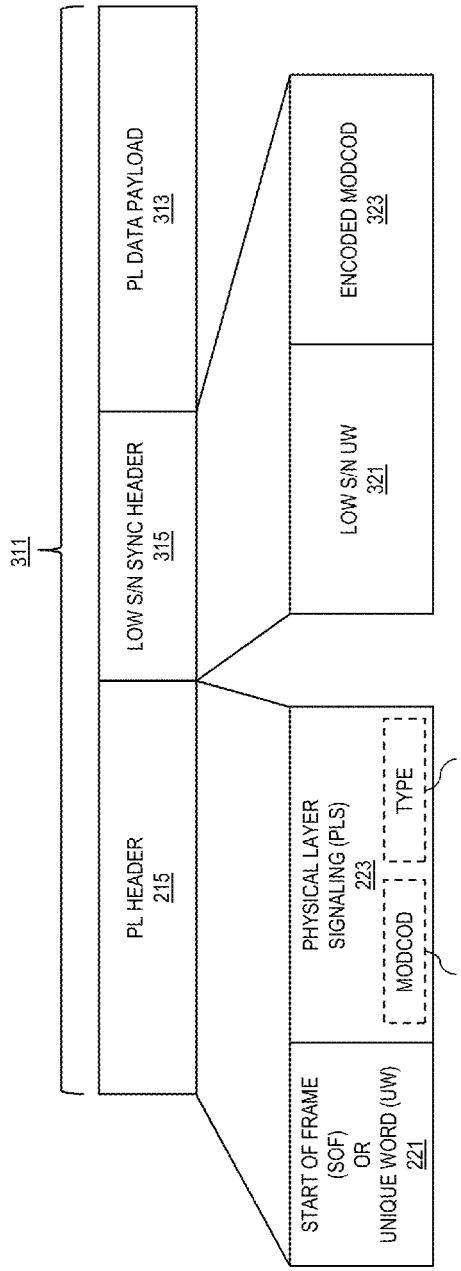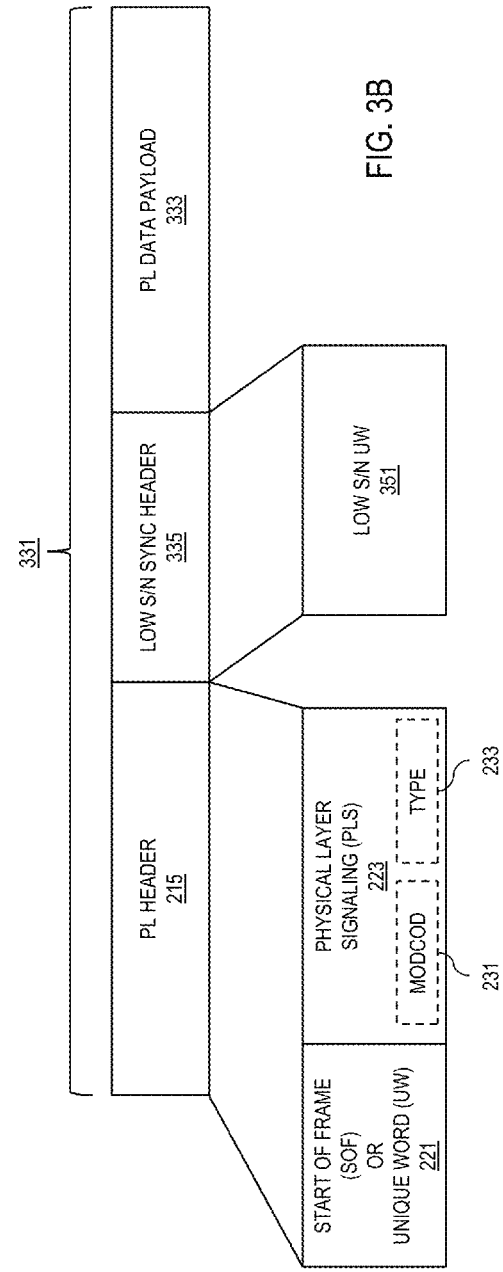

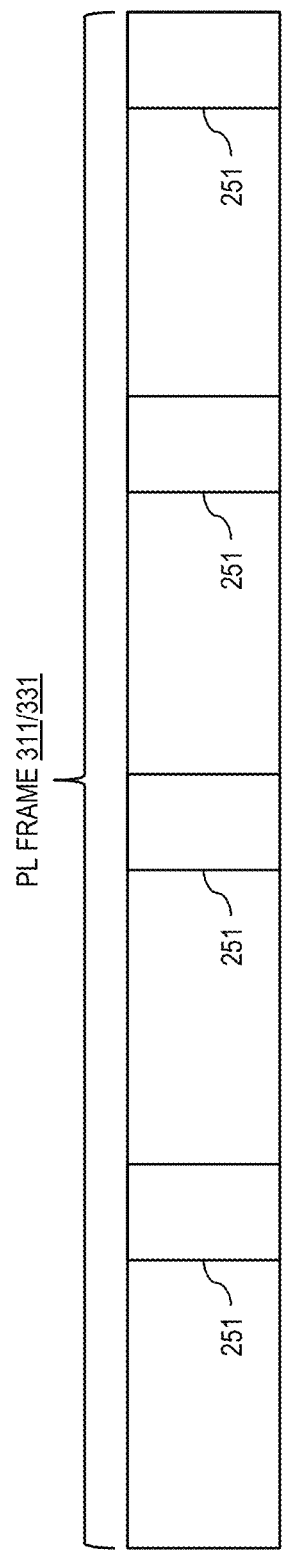

APPARATUS AND METHOD FOR SUPPORT OF COMMUNICATIONS SERVICES AND APPLICATIONS OVER RELATIVELY LOW SIGNAL-TO-NOISE RATIO LINKS

RELATED APPLICATIONS

This application is a continuation, and claims the benefit of the filing date under 35 U.S.C. §120, of U.S. patent application Ser. No. 13/763,731 (filed 10 Feb. 2013), the disclosure of which is incorporated herein by reference in its entirety.

BACKGROUND

Over recent decades, developments in data communications technologies have continued to provide enhanced multimedia services (e.g., voice, data, video, etc.) to end-users. Such communications technologies encompass various delivery platforms, including terrestrial wire-line, fiber and wireless communications and networking technologies, and satellite communications and networking technologies. Further, in recent years, the proliferation of mobile communications has spurred an exponential growth in the provision of such enhanced multimedia services over mobile communications networks (both terrestrial and satellite based). As part of the continued evolution of such communications platforms and supporting technologies, the Digital Video Broadcasting (DVB) organization was formed (as an industry-led, global consortium of broadcasters, manufacturers, network operators, software developers, regulatory bodies and others) to advance the design of open interoperable standards for the global delivery of digital media and broadcast services.

As part of the standardization process for digital media and broadcast services, the DVB organization managed the adoption and publication of the DVB-S2 standard via recognized standards setting organizations (e.g., ETSI and TIA). DVB-S2 is a digital satellite transmission system standard covering framing structure, channel coding and modulation systems, designed for broadcast services (for standard and high definition television), interactive services (e.g., Internet access for consumer applications), and other broadband satellite applications. DVB-S2 represents a flexible standard, covering a variety of data and multimedia services delivered over satellite communications systems. The DVB-S2 standard covers various technological features, such as a flexible input stream adapter (suitable for operation with single and multiple input streams of various formats), a robust forward error correction coding (FEC) system based on low-density parity check (LDPC) codes concatenated with BCH codes, a wide range of code rates (from 1/4 up to 9/10), four signal constellations (ranging in spectrum efficiency from 2 bit/s/Hz to 5 bit/s/Hz), and adaptive coding and modulation (ACM) functionality (optimizing channel coding and modulation on a frame-by-frame basis).

Since its inception, the DVB-S2 standard has been adopted globally as a predominant standard for broadcast, interactive and other broadband services over satellite communications networks. Currently, there are applications, particularly in the field of mobile communications, that require lower signal-to-noise ratios ($E_s/N_0$), down to approximately −9 dB to −10 dB. The current DVB-S2 frame format, however, supports operation down to $E_s/N_0$ ratios of only about −3 dB, and thus the existing DVB-S2 frame format cannot support the operational requirements of such current mobile applications. Further, more recently an extension has been added to the DVB-S2 standard ("DVB-S2 Wideband"). In the wideband extension, the modulation and coding field was increased in size, and a different code was employed, as compared with the original DVB-S2. This wideband extension of the DVB-S2 standard, however, also fails to support the lower signal-to-noise ratio requirements of current mobile applications.

What is needed, therefore, are systems and methods to address the challenges arising from communications system requirements associated with the support of current and future communications services and applications (particularly in the field of mobile communications) over relatively low signal-to-noise ratio ($E_s/N_0$) links with corresponding low signal-to-noise ratio communications terminals.

Some Exemplary Embodiments

The present invention advantageously addresses the foregoing requirements and needs, as well as others, by providing a system and methods for the support of communications services and applications over relatively low signal-to-noise ratio ($E_s/N_0$) links with corresponding low signal-to-noise ratio communications terminals, while remaining compatible with existing protocols for higher signal-to-noise ratio links.

According to an exemplary embodiment, a method for generating a physical layer (PL) data frame for transmission over a wireless communications network is provided. The method comprises generating a PL data payload by encoding and modulating one or more source data frames in accordance with a first modulation and coding (modcod) scheme selected from a first set of modcod schemes. The method further comprises appending a synchronization (sync) header to the PL data payload, wherein the sync header comprises a one unique word (UW) of a UW set, wherein each UW of the UW set corresponds to a different respective one of the first set of modcod schemes, and the one UW of the sync header corresponds to the selected first modcod scheme. The method further comprises appending a PL header to the combined sync header and PL data payload to form the PL data frame, wherein the PL header comprises a second UW and physical layer signaling (PLS) data, wherein the PLS data comprises encoded data fields reflecting information indicating a length of the PL data frame, and wherein the data fields are encoded in accordance with a second modcod scheme selected from a second set of modcod schemes. In accordance with the method, each modcod scheme of the second set is designed for terminals of a second signal-to-noise ratio (SNR) operating range, and each modcod scheme of the first set is designed for terminals of a first SNR operating range that is relatively lower than the second SNR operating range. Further, the modcod schemes of the first set may be designed for encoding data intended for transmission over a channel of the wireless communications network to the terminals of the first SNR operating range, to enable reliable decoding of the transmitted data by the terminals of the first SNR operating range, wherein the first SNR operating range comprises an upper end at an $E_s/N_0$ value less than or equal to approximately −3 dB.

According to a further embodiment, the UW set comprises a structured set of unique words designed to facilitate efficient and reliable detection by the terminals of the first SNR operating range. The structured UW set comprises a structured set of unique words designed to minimize the auto-correlation and cross-correlation properties of UW vectors associated with the UW set. Further, the structured UW set may comprise a structured set of unique words designed by dividing a first UW of a length of 'K' bits into 'N' segments (each of a length 'L'), where each segment contains a same L-bit pattern (with either + or − polarity), and generating a set of 'N' structured unique words (each of the length 'K' bits) based on the 'N' segments of the first UW, wherein each UW of the UW set comprises a different combination or ordering of the L-bit pattern (with either + or − polarity). Further, the structured set of unique words may be generated based on an orthogonal matrix comprising one of a Butson-Hadamard matrix and a Walsh matrix, where all columns/rows of the matrix are mutually orthogonal.

According to a further embodiment, in order to extend operation to relatively lower $E_s/N_0$ links, a number of pilot blocks inserted in a PL frame destined for lower S/N terminals may be increased, which ensures synchronization performance of terminals operating at lower SNR. One or more additional pilot block patterns of the same length may be inserted between regular pilot blocks. For example, the pilot block insertion may be doubled.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A illustrates a communications system capable of employing protocols for the support of communications services and applications over relatively low signal-to-noise ratio ($E_s/N_0$) links, in accordance with exemplary embodiments of the present invention;

FIG. 2A illustrates the frame format of a physical layer frame in accordance with the prior art DVB-S2 framing structure, channel coding and modulation systems standard;

FIG. 2B illustrates the physical layer frame of FIG. 2A, including pilot symbols, in accordance with the prior art DVB-S2 framing structure, channel coding and modulation systems standard;

FIG. 3A illustrates a physical layer framing structure for physical layer frames intended for lower S/N terminals, in accordance with an exemplary embodiment of the present invention;

FIG. 3B illustrates a physical layer framing structure for physical layer frames intended for lower S/N terminals, in accordance with another exemplary embodiment of the present invention;

FIG. 3C illustrates a physical layer frame of either of FIGS. 3A or 3B, including pilot symbols, in accordance with exemplary embodiments of the present invention;

DETAILED DESCRIPTION

Figure 1B:
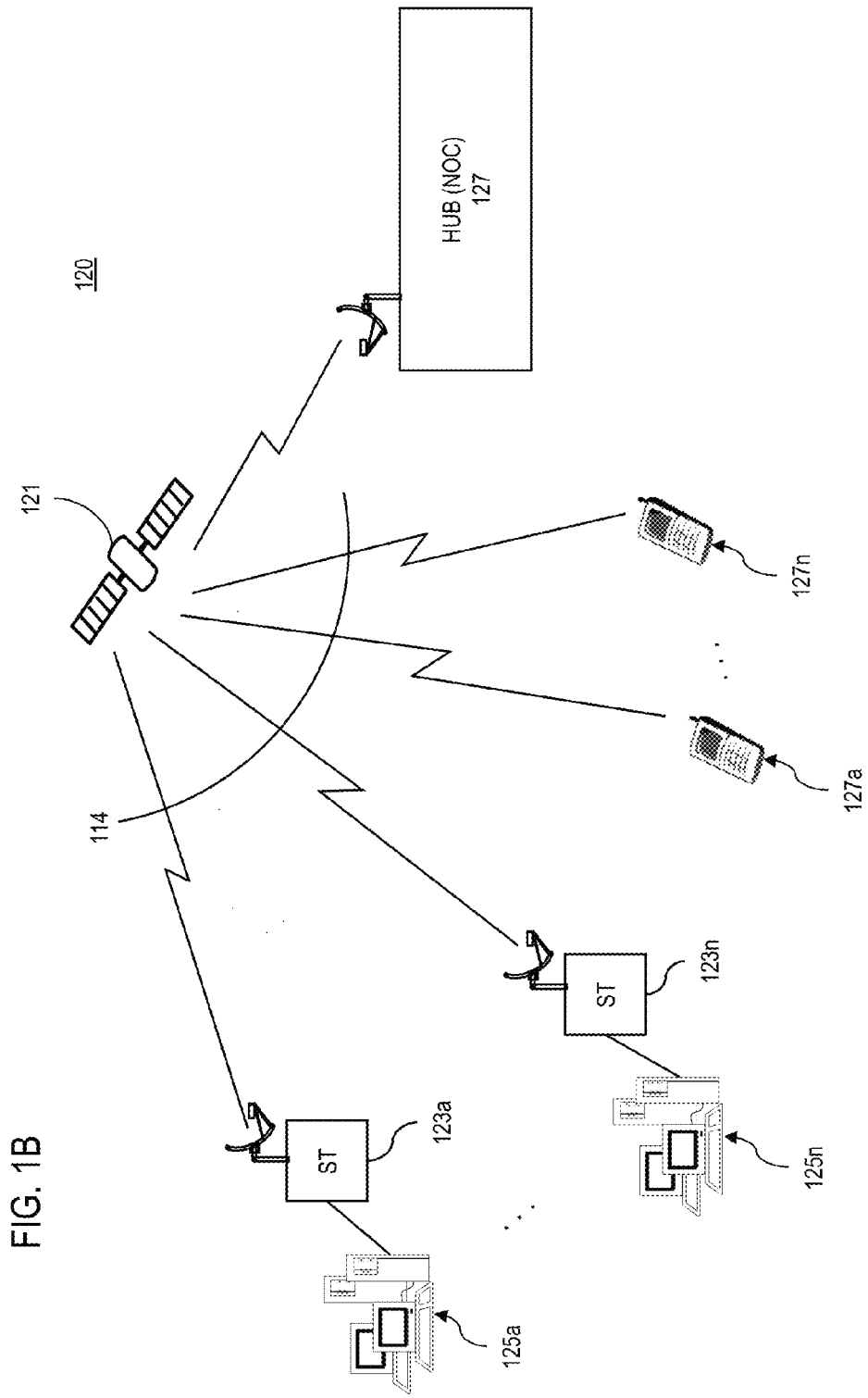
FIG. 1B illustrates a satellite communications system capable of employing protocols for the support of communications services and applications over relatively low signal-to-noise ratio ($E_s/N_0$) links, in accordance with exemplary embodiments of the present invention.

A system and methods for communications system protocols to support communications services and applications over relatively low signal-to-noise ratio ($E_s/N_0$) links, is described. In the following description, for the purposes of explanation, numerous specific details are set forth in order to provide a thorough understanding of the invention. It is apparent, however, that the invention may be practiced without these specific details or with an equivalent arrangement. In other instances, well known structures and devices are shown in block diagram form in order to avoid unnecessarily obscuring the invention.

FIG. 1A illustrates a communications system capable of employing protocols for the support of communications services and applications over relatively low signal-to-noise ratio ($E_s/N_0$) links, in accordance with exemplary embodiments of the present invention. With reference to FIG. 1A, a broadband communications system 110 includes one or more transmitters 112 (of which one is shown) that generate signal waveforms for transmission to one or more receivers 116 (of which one is shown). The signal waveforms are transmitted across a communications channel 114, which (for example) may comprise a channel of a terrestrial, wireless terrestrial or satellite communications system. In this discrete communications system 110, the transmitter 112 has a signal source that produces a discrete set of data signals, where each of the data signals is transmitted over a corresponding signal waveform. The discrete set of data signals may first be encoded (e.g., via a forward error correction (FEC) code) to combat noise and other issues associated with the channel 114. Once encoded, the encoded signals may then be modulated onto a carrier for transmission over the channel 114. The signal waveforms are attenuated, or otherwise altered, by communications channel 114.

FEC is required in terrestrial and satellite systems to provide high quality communication over a radio frequency (RF) propagation channel, which induces signal waveform and spectrum distortions, including signal attenuation (freespace propagation loss), multi-path induced fading and adjacent channel interference. These impairments drive the design of the radio transmission and receiver equipment; exemplary design objectives include selecting modulation formats, error control schemes, demodulation and decoding techniques and hardware components that together provide an efficient balance between system performance and implementation complexity. Differences in propagation channel characteristics, such as between terrestrial and satellite communication channels, naturally result in significantly different system designs. Likewise, existing communications systems continue to evolve in order to satisfy increased system requirements for new higher rate or higher fidelity communication services.

FIG. 1B illustrates a satellite communications system capable of employing protocols for the support of communications services and applications over relatively low signal-to-noise ratio ($E_s/N_0$) links, in accordance with exemplary embodiments of the present invention. With reference to FIG. 1B, satellite communications system 120 includes a satellite 121 that supports communication among multiple satellite terminals (STs) 123a-123n, user terminals (UTs) 127a-127n, and a hub 127. The HUB 127 may assume the role of a Network Operations Center (NOC), which controls the access of the STs 123a-123n and UTs 127a-127n to the system 120, and also provides element management functions and control of the address resolution and resource management functionality. The Satellite communications system 120 may operate as a traditional bent-pipe system, where the satellite essentially operates as a repeater. Alternatively, the system 120 may employ a switching or processing satellite supporting mesh communications (point-to-point communications directly between a pair of the STs 123a-123n and UTs 127a-127n).

In a traditional bent-pipe system of an exemplary embodiment, for example, the satellite operates as a repeater or bent pipe, and communications between the STs 123a-123n and UTs 127a-127n are transmitted over a double-hop path. For example, in a communication from ST 123a to ST 123n, over the first hop, the communication is transmitted, via the satellite, from the ST 123a to the HUB 127. The HUB 127 decodes the communication and determines the destination as ST 123n. The HUB 127 then appropriately addresses and repackages the communication, encodes and modulates it, and transmits the communication over the second hop, via the satellite, to the destination ST 123n. Accordingly, the satellite of such a system acts as a bent pipe or repeater, transmitting communications between the HUB 127 and the STs/UTs.

In an alternate embodiment, with a communications system 120 that employs a processing satellite (e.g., including a packet switch operating, for example, at a data link layer), the system may support direct unicast (point-to-point) communications and multicast communications among the STs 123a-123n and UTs 127a-127n. In the case of a processing satellite, the satellite 121 decodes the received signal and determines the destination ST(s)/UT(s) (as the hub 127 would in a bent-pipe system). The satellite 121 then addresses the data accordingly, encodes and modulates it, and transmits the modulated signal, over the channel 114, to the destination ST(s)/UT(s). Further, the STs 123a-123n may each provide connectivity to one or more respective hosts (e.g., hosts 125a-125n, respectively).

As mentioned above, as one exemplary embodiment for broadcast and broadband communications services over satellite networks, the DVB-S2 standard has been adopted globally as a predominant standard for broadcast, interactive and other broadband services and applications. The framing structure, channel coding and modulation systems of the DVB-S2 standard are described in the European Telecommunications Standards Institute (ETSI) publication ETSI EN 302 307 V1.3.1, which is incorporated herein by reference in its entirety. DVB-S2 represents a flexible standard, covering a variety of data and multimedia services delivered over satellite communications systems. According to one exemplary embodiment, Generic Stream Encapsulation (GSE) protocol may be employed to provide a data link layer protocol that facilitates the transmission of user or application data from packet oriented protocols (e.g., Internet protocol or IP) on top of a unidirectional physical layer protocol (e.g., DVB-S2). According to the GSE protocol, application data in the form of packet data units (PDUs) are first encapsulated within the baseband frames of the communications network (e.g., DVB-S2 baseband packets in a satellite communications system).

The DVB-S2 standard, for example, was designed to facilitate robust synchronization and signaling at the physical layer, and synchronization and detection of the modulation and coding parameters by a receiver before demodulation and FEC decoding. At the physical layer, baseband frames are first encoded (e.g., via outer coding (BCH), Inner Coding (LDPC) and Bit interleaving) to form an output stream of FEC frames. Each FEC frame (comprising a sequence of 64,800 bits for a normal FEC frame, or 16,200 bits for a short FEC frame) is then modulated based on one of various options specified in the standard for modulation of the data payload (e.g., QPSK, 8PSK, 16APSK, or 32APSK). For example, each FEC frame is serial-to-parallel converted, and each resulting parallel sequence is mapped based on a signal constellation, generating an (I, Q) sequence of variable length depending on the selected modulation efficiency ($\eta_{MOD}$ bits/Hz). The resulting output sequence is referred to as a complex FEC frame or XFEC frame, composed of $64,800/\eta_{MOD}$ (normal XFEC frame) modulation symbols for a normal XFEC frame, or $16,200/\eta_{MOD}$ (short XFEC frame) modulation symbols for a short XFEC frame. Physical Layer framing is then performed, by slicing the XFEC frames into a number of fixed length slots (of length M=90 symbols each), to generate the physical layer frames.

FIG. 2A illustrates the frame format of a physical layer frame in accordance with the prior art DVB-S2 framing structure, channel coding and modulation systems standard. With reference to FIG. 2A, at a high level, the DVB-S2 physical layer framing comprises the structuring of the baseband frames (resulting from the upper layer encapsulation of user or application data) as a regular sequence of periodic physical layer frames (PL Frames) 211. Every PL Frame is composed of a physical layer data payload (PL Payload) 213 and a physical layer header (PL Header) 215. The payload comprises the modulation symbols resulting from the encoding and modulation of the source data bits, generated by encoding and modulating the source data bits according to the selected modulation and coding scheme, as described above. The PL Payload 213 corresponds to a code block of a concatenated LDPC/BCH FEC. The PL Header 215, which is intended for receiver synchronization and physical layer signaling, contains synchronization and signaling information (e.g., Start of Frame or UW field, type of modulation and FEC rate, frame length, presence/absence of pilot symbols). The PL Header comprises 90 modulation symbols (using a fixed π/2 binary modulation), and the PL Payload comprises an integer multiple of 90 modulation symbols (excluding pilot symbols). The PL Header is encoded via a very low-rate 7/64 block code (suitable for soft-decision correlation decoding), and a minimized number of signaling bits to reduce decoding complexity and global efficiency loss. The PL Header is always encoded in this fashion, because it is the first entity to be decoded by the receiver and provides the requisite information (e.g., modcod and type information, discussed below) necessary for enabling the receiver to decode the PL Data Payload, and thus the header must be decodable under worst-case link conditions.

With the current DVB-S2 standards (either with the original narrow or normal band protocols or the wideband extension of the standard), synchronization represents the primary challenge for applications over relatively low signal-to-noise ratio (SNR) channels or links. For example, the PL Header 215 of the original DVB-S2 format comprises a Start of Frame (SOF) field (also referred to herein as the Unique Word or UW) 221, comprising 26 symbols. The 26 symbol UW is uniform from frame to frame, and is inserted generally as a synchronization word for frame detection. The UW is used as a reference for detection of a burst or frame, and as a timing and frequency reference for decoding the header and payload portion of the frame. The UW field is followed by a Physical Layer Signaling (PLS) field 223, comprising 64 symbols. The PLS field reflects seven signaling bits bi-orthogonally coded via a non-systematic binary code of length 64 and dimension seven (64, 7). The seven signaling bits comprise two fields, a five bit modulation and coding or "modcod" field 231, and a two bit type field 233. The modcod field identifies the modulation and coding applied to the data payload (e.g., the modulation and coding applied to convert the baseband frames into the encoded and modulated XFEC frames—the XFEC frame modulation and FEC code rate). The type field identifies the FEC frame length (either 64,800 bits or 16,200 bits) and indicates the presence or absence of pilot symbol blocks (further described below).

Further, according to the wideband extension of the DVB-S2 standard (described in Annex M of ETSI EN 302 307), the PL Header 215 was extended to two 90 symbol slots. The SOF field or UW 221 remained at 26 symbols, and the PLS field 223 was extended to be 154 symbols. Further, the modcod field was extended to comprise 6 bits in order to allow for additional modulation and coding configurations over those of the original DVB-S2 standard, and the type field remained unchanged. The PLS field is generated based on a (80,16) convolutional code (with puncturing to output only 77 coded bits instead of 80), with the output bits being repeated twice to produce the (154, 16) codeword. While the modcod/type field is encoded in this fashion to enable reliable decoding, such coding achieves sufficient reliability down to an $E_s/N_0$ of only about −3 dB, and thus (similar to the framing protocols of the original DVB-S2 standard) would also not reach lower S/N terminals at $E_s/N_0$ values down to the region of approximately −9.5 dB to −10 dB.

Based on recent trends in the advancement of current applications and services and in the development of new applications and services, it is envisioned that systems employing a multiplexing of data signals on the same channel 114 (e.g., time multiplexed), where (on a frame-by-frame basis) such data signals may be destined for different receive terminals of different capabilities (e.g., any combination of STs 125a-125n and UTs 127a-127n. For example, data signals destined for high S/N terminals (e.g., any of the STs 125a-125n) may be multiplexed with data signals destined for lower S/N terminals (e.g., any of the UTs 127a-127n), on the same channel 114 (on a frame-by-frame basis). Under such scenarios, with respect to synchronization, one important aspect of the PLS field of the PL Header is that it conveys the length of the respective frame, and thereby specifies the location of the beginning of the following frame (the next PL Header). In other words, after detecting the UW (SOF field) and decoding the PLS field, the receiver is able ascertain the PL Frame duration and structure, the modulation and coding scheme of the XFEC frame, and the presence or absence of pilot symbols. Under current protocols (such as DVB-S2), therefore, in order for the low S/N terminals to maintain continuous synchronization, they would need to decode the modcods of all the frames, including the frames intended for the high S/N terminals. In other words, in order to determine frame lengths and the location of the beginning of subsequent frames (to maintain synchronization) the low S/N terminals would need to detect the unique words and decode the PLS fields (to ascertain the modcods) of the frames intended for the high S/N terminals. Under such protocols, however, reliable detection of the UW and decoding of the PL Header in low SNR links (e.g., at $E_s/N_0$ values of less than about −3 dB) is impossible. In order to facilitate the decoding of the PLS fields (to ascertain the modcods) by the low S/N terminals, therefore, more robust synchronization schemes would have to be employed, which would add a significant level of unnecessary overhead for the high S/N terminals (which would also require modification of existing high S/N terminals under development and already in the marketplace to maintain compatibility).

In accordance with exemplary embodiments of the present invention, in order to avoid such modifications to the requirements for the high S/N terminals, more robust encoding and modulation schemes are employed, which are applied to only the baseband frame data intended for the lower S/N terminals. Under such schemes, a number of different, more robust, modulation and coding options are provided for encoding the data intended for the low S/N terminals. For example 5 new modulation and coding scheme combinations may be provided—three modulation and coding schemes of π/2-BPSK with rate 1/3, 1/4 or 1/5 and two modulation and coding schemes of π/2-BPSK with rate 1/4 or 1/5 (repeated 2 times), (as further discussed below). In order not to change the requirements for (and overburden) the high S/N terminals, these new modulation and coding options are indicated by modcod field values, using current PL Header coding schemes (e.g., the (64, 7) coding of the original DVB-S2 standard, and the (154, 16) coding of the DVB-S2 wideband extension). Accordingly, the high S/N terminals would detect the SOF field (UW) and decode the PLS field as usual, and then need only recognize the new modcod field values for the lower S/N terminals to determine the PL Frame length in order to skip to the next PL Frame (thereby maintaining continuous synchronization). As a further option, high S/N terminals could (but need not) be modified to decode all PL Frames.

According to one exemplary embodiment, within the framework of the current DVB-S2 standards (for example), two existing (currently unassigned) modcod values of the PLS field are assigned to designate the PL Frames encoded using the modulation and coding schemes intended for the lower S/N terminals. For example, one of the modcod values would identify a PL Frame of a first type (Type 1), wherein a modulation and coding scheme of π/2-BPSK with rate 1/3, 1/4 or 1/5 was applied, and the second modcod value would identify a PL Frame of a second type (Type 2), wherein a modulation and coding scheme of π/2-BPSK with rate 1/4 or 1/5 (repeated 2 times) was applied. Under this scenario, each low S/N frame type is of a different respective modulated symbol length—the Type 1 frames are all of a first modulated symbol length, and the Type 2 frames are all of a second modulated symbol length. This is achieved for each frame type by encoding a number of data bits, based on the selected modulation and code rate, that would result in the respective modulated symbol length for the frame type. In the case of a PL Frame intended for a lower S/N terminal, the high S/N terminals would detect the UW and decode the PLS field as usual, and (based on the modcod value) would ascertain a PL Frame duration (length in modulation symbols) of one of the two types. The high S/N terminal would then skip the ascertained number of modulation symbols to locate the start of the next PL Frame. Further, because the new modulation and coding schemes fall into the two types, reflecting only two distinct PL Frame lengths for the PL Frames destined for the lower S/N terminals, five different modulation and coding scheme combinations are covered utilizing only two modcod field values of the existing framework (e.g., only 2 of the $2^5$ modcod values of the original DVB-S2 framework, and 2 of the $2^6$ modcod values of the wideband DVB-S2 framework).

One of skill in the art will, however, appreciate that the respective modulation and coding schemes, and the resulting frame lengths, need not be limited to the foregoing examples. It will be evident that various alternative protocols may be devised within the scope of the broader concepts of the disclosed exemplary embodiments, whereby, within the general framework of current protocols (e.g., the DVB-S2 standard), the high S/N terminals would be able to decode, identify and determine the length/duration of the PL Headers of the frames intended for lower S/N terminals.

With respect to the lower S/N terminals, however, as mentioned above, in order for the low S/N terminals to also maintain continuous synchronization, they would need to decode the modcods of all the frames, including the frames intended for the high S/N terminals. Then again, as described with respect to the foregoing exemplary embodiments, considering that the current framing protocols are maintained for the PL Headers (with new modulation and coding schemes for lower S/N terminals indicated via new modcod field values within such current protocols), the lower S/N terminals would still be unable to reliably decode the PL Headers to maintain continuous synchronization. The protocols of such exemplary embodiments, therefore, further require that the lower S/N terminals operate in a "burst mode," performing synchronization on a frame-by-frame basis. In a burst mode synchronization scheme, the demodulator within the receiver section of the low S/N terminal would estimate all the signal parameters (e.g., UW detection, frequency estimation, timing estimation, and carrier (phase) estimation) independently for each frame. Again, that is because, without modifying the synchronization protocols for the high S/N terminals, the low S/N terminal would not be able to synchronize and perform such estimates based on the current PL Header framework. Accordingly, when a frame intended for the low S/N terminal arrives, the terminal must be capable of quickly detecting it and acquiring synchronization for that frame.

According to further exemplary embodiments of the present invention, therefore, in order to facilitate burst mode synchronization for relatively low S/N terminals (e.g., down to the region of approximately −9.5 dB to −10 dB), a sufficient sized unique word (Low S/N UW) is provided to enable reliable detection and synchronization on a frame-by-frame basis. For example, a unique word of 512 bits may be employed. If higher reliability is required, according to further exemplary embodiments, the unique word may comprise a larger number of bits, for example 720 bits. As becomes evident, however, there is a tradeoff between the size/reliability of the unique word and data/bandwidth efficiency.

FIG. 3A illustrates a physical layer framing structure for physical layer frames intended for lower S/N terminals, in accordance with an exemplary embodiment of the present invention. With reference to FIG. 3A, so as not to disturb the PL framing of current protocols (e.g., DVB-S2) for the high S/N terminals, according to one embodiment, a second physical layer synchronization header (Low S/N Synch Header) 315 is inserted in the frames destined for the lower S/N terminals, following the original PL Header 215. The Low S/N UW 321 is located within the Low S/N Sync Header 315.

Additionally, according to such embodiments, in order to further maintain compatibility with existing protocols, the Low S/N Sync Header takes the place of a respective number of data modulation symbols of the original PL Data Payload 213 (and consequently an associated number of data bits) so as not to disrupt or change the overall PL Frame structure of such existing protocols. For example, in the case of the DVB-S2 standard, the PL Data Payload 313 plus the Low S/N Sync Header 315 will still consist of an integer multiple of 90 symbols (excluding pilot symbols). Further, the additional Low S/N Sync Header will not be inserted in PL Frames intended for high S/N terminals, and thus the bandwidth/data efficiency of such PL Frames will also be maintained.

Figure 4:
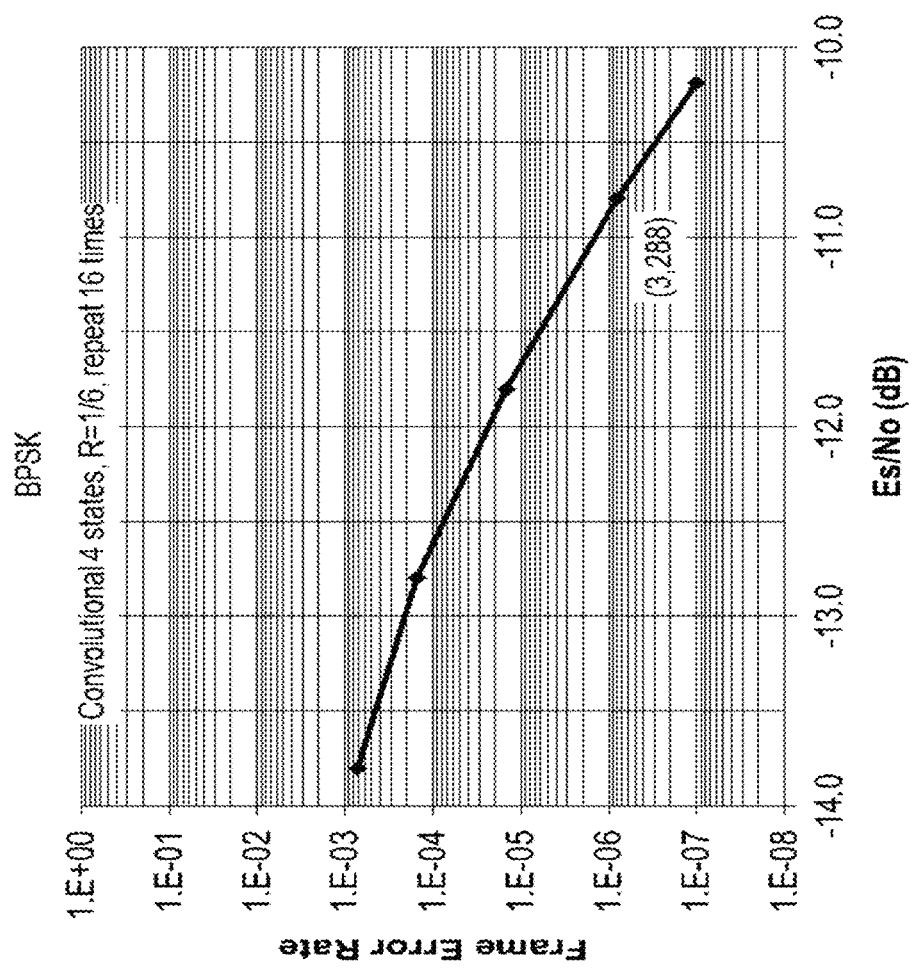
FIG. 4 illustrates the performance curve associated with the FEC coding required to protect an additional 3 bit modcod field to support up to eight ($2^3$) new modcod field values, in accordance with exemplary embodiments of the present invention.

Accordingly, the provision of a sufficient sized unique word (e.g., the Low S/N UW 321) in such L/N Sync Headers 315 of the PL Frames intended for lower S/N terminals will enable reliable detection and synchronization, whereby the low S/N terminals will be able to detect the Low S/N UW and synchronize on a frame-by-frame basis. In order to decode the payload of such PL Frames 311, however, the terminals also need to be able to ascertain the modulation and coding employed. In that regard, according to one exemplary embodiment, the L/N Sync Headers will also include modulation symbols reflecting an encoded modcod field 323 that reflects modcod bits that designate the particular modulation and encoding employed in the generation of the PL Data Payload 313. Accordingly, any number of modulation and coding scheme combinations could be covered by a respective number of new modcod field values. Adding an additional modcod field 323 to the L/N Sync Headers of PL Frames intended for lower S/N terminals, however, would result in a further sacrifice of bandwidth/data efficiency. For example, an additional 3 bit modcod field would support up to eight ($2^3$) new modcod field values. FIG. 4 illustrates the performance curve associated with the FEC coding required to protect an additional 3 bit modcod field to support up to eight ($2^3$) new modcod field values, in accordance with exemplary embodiments of the present invention. As reflected by FIG. 4, however, due the low $E_s/N_0$, a sufficient FEC coding required to protect the additional 3 bit modcod field (e.g., using tail-biting convolutional codes) may require as many as 288 bits (or more), which would result in a relatively high sacrifice of data capacity.

FIG. 3B illustrates a physical layer framing structure for physical layer frames intended for lower S/N terminals, in accordance with another exemplary embodiment of the present invention. With reference to FIG. 3B, according to a further exemplary embodiment, therefore, a set of different low S/N unique words (Low S/N UWs) is provided, whereby the different modulation and coding schemes are each designated by a respective low S/N UW out of the set of different low S/N unique words. In other words a different Low S/N UW is assigned to each of the new modulation and coding schemes provided for more robust encoding of the data intended for the lower S/N terminals. Each Low S/N UW of the set is of the same length. For example, a set of 5 different unique words is designed to respectively designate the 5 modulation and coding scheme combinations of the two types for the new PL Frames for lower S/N terminals (as described above). Namely three modulation and coding schemes of π/2-BPSK with rate 1/3, 1/4 or 1/5, and two modulation and coding schemes of π/2-BPSK with rate 1/4 or 1/5 (repeated 2 times). A lower S/N terminal could, therefore, reliably detect and synchronize based on the Low S/N UW 351 (on a frame-by-frame or burst mode basis). Further, based on the particular Low S/N UW 351 detected, the lower S/N terminal could also determine the particular modcod scheme applied to the to the PL Data Payload 333, without requiring any further modcod field in the Low S/N Sync Header 335. Accordingly, reliable burst mode synchronization and data payload decoding is facilitated without any further sacrifice of data capacity in the PL Data Payload 333.

Additionally, with respect to the design of the set of Low S/N unique words, if unstructured, the detection of such unique words would require an increased number of unique word detectors to search for and detect each UW of the set, which in turn increases the burden and complexity of the receiver. In order to not overburden the receivers of the lower S/N terminals with the requirement of searching for and detecting an unstructured set of different unique words, according to exemplary embodiments, a set of 'N' structured unique words is designed to facilitate efficient and reliable detection at $E_s/N_0$ values of less than about −3 dB and down to about −9.5 dB to −10.0 dB. According to exemplary embodiments, the Low S/N UW set is designed to minimize the auto-correlation and cross-correlation properties of the UW vectors. Auto-correlation implies the correlation of a UW vector with the delayed version of itself over successive time intervals, and cross-correlation implies the correlation between the different vectors within the UW set. Examples of such design techniques are described in U.S. Pat. No. 8,594,230, which is incorporated herein by reference in its entirety. For example, given any UW of a length of 'K' bits divided into 'N' segments (each of a length 'L'), where each segment contains the same L-bit pattern (with either + or − polarity), a set of 'N' structured Low S/N unique words (each of the length 'K' bits) can be generated based on the 'N' segments of the given UW. Generally, each UW of the set of N Low S/N unique words will contain a different combination or ordering of the same L-bit pattern (with either + or − polarity). This structure thus produces the benefit of reducing the length of UW correlation by a factor of N compared with an arbitrary K bit UW. Accordingly, up to N possible unique words can be detected, supporting up to N different modcod schemes, with reduced complexity in the receiver.

According to one embodiment, the UW set can be constructed based on a Walsh matrix, where the dot product of any two distinct rows/columns is zero. According to one example, a single 512 bit UW can be divided into 8 sections (each of a 64 bit length), where 8 combinations of these sections form 8 different possible unique words (each of length 512 bits), respectively corresponding to 8 possible different new modcod schemes. Pursuant to this structure, the length of UW correlation is reduced by a factor of 8, as compared with an arbitrary 512 bit UW. For example, the 8 possible UW structures can be reflected as follows: 00000000, 00001111, 00110011, 00111100, 01010101, 01011010, 01100110, 01101001, where a 0 represents a 64-bit pattern with "+" polarity, and a 1 represents the same pattern with "−" polarity. Similarly, according to a further example, a single 720 bit UW can be divided into 8 sections (each of a 90 bit length), where 8 combinations of these sections form 8 different possible unique words (each of length 720 bits), respectively corresponding to 8 possible different new modcod schemes. Pursuant to this structure, the length of UW correlation is also reduced by a factor of 8, as compared with an arbitrary 720 bit UW. For example, the 8 possible UW structures can be reflected as follows: 00000000, 00001111, 00110011, 00111100, 01010101, 01011010, 01100110, 01101001, where a 0 represents a 90-bit pattern with "+" polarity, and a 1 represents the same pattern with "−" polarity.

Alternatively, according to a further embodiment for the design of the set of Low S/N UWs, the UW set can be constructed based on a more general class of orthogonal matrices. Examples such are Butson-Hadamard matrices (of which a Walsh matrix is a subset), where all columns/rows of a matrix H of size N are mutually orthogonal. Each column of the UW matrix represents one UW vector, and the number of vectors in the set will be the same as the number of segments.

FIG. 2B illustrates the physical layer frame of FIG. 2A, including pilot symbols, in accordance with the prior art DVB-S2 framing structure, channel coding and modulation systems standard. As a further option, pursuant to the DVB-S2 framework, periodic known pilot blocks may be inserted in the DVB-S2 frame formatting to aid in carrier tracking. In an exemplary embodiment of the DVB-S2 standard, as illustrated in FIG. 2B, each pilot block comprises a known sequence of 36 consecutive pilot symbols inserted between groups of 1440 PL Frame modulation symbols (36 pilot symbols inserted every 16 slots of 90 symbols). In other words, a block of pilot symbols is inserted at a period of 36+1440=1476. Accordingly, carrier recovery in the receivers may be facilitated by the introduction of such a regular raster of pilot symbols, while a transmission mode excluding pilot blocks achieves additional bandwidth efficiency (useful capacity).

FIG. 3C illustrates a physical layer frame of either of FIGS. 3A or 3B, including pilot symbols, in accordance with exemplary embodiments of the present invention. In order to extend operation to relatively lower $E_s/N_0$ links, according to further exemplary embodiments of the present invention, the number of pilot blocks inserted in a PL Frame destined for lower S/N terminals may be increased. According to one embodiment, as illustrated in FIG. 3C, to ensure synchronization performance of lower S/N terminals operating at ranges down to −10 dB $E_s/N_0$, an additional pilot block pattern of the same length is inserted between the regular pilot blocks 251 for the higher S/N terminals. For example, the known blocks of 36 pilot symbols 251 are inserted every 1476/2=738 symbols, which doubles the pilot block insertion. Importantly, while the additional pilot blocks are available to facilitate improved carrier tracking for lower S/N terminals, the high S/N terminals (which are expecting to find the original 36 pilot symbols inserted every 1476 symbols) will still receive the pilot structure of the original framework, and hence will be able to maintain their synchronization. Only the lower S/N terminals need process the additional pilot symbol blocks.

Figure 5:
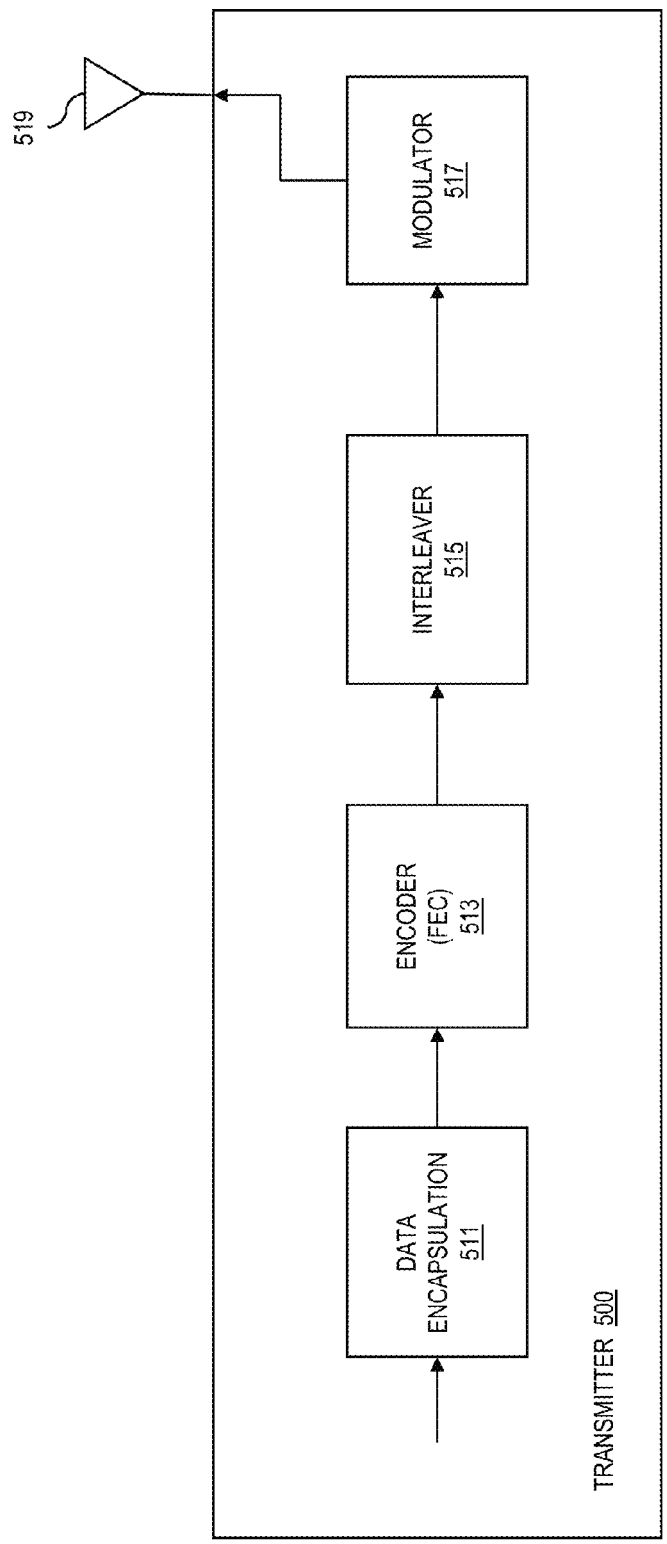
FIG. 5 illustrates a block diagram of an exemplary transmitter configured to operate in the systems of FIGS. 1A and 1B, in accordance with exemplary embodiments of the present invention.

FIG. 5 illustrates a block diagram of an exemplary transmitter configured to operate in the systems of FIGS. 1A and 1B, in accordance with exemplary embodiments of the present invention. With reference to FIG. 5, the transmitter 500 is equipped with a data encapsulation module 511 that accepts the original application layer source data and performs the upper layer encapsulation to from the baseband frames. The encoder (e.g., an FEC encoder) 513 receives the baseband frames from the data encapsulation module 511, and outputs a coded stream of higher redundancy suitable for error correction processing at the receiver (shown in FIG. 6). The encoder passes the encoded stream to the interleaver 515, which reorders the sequence of symbols or bits from the encoder in a predetermined manner. The interleaved signal is fed to the modulator 517, which maps the encoded messages to signal waveforms, based in part on modulation signal constellations. For example, the data encapsulation module 511 performs the upper layer encapsulation to generate the baseband frames based on the source data bits, and then the encoder 513, interleaver 515 and modulator 517 collectively perform the modulation and coding of the baseband frames and the generation of the physical layer frames, in accordance with the exemplary embodiments of the present invention. The physical layer frames are then transmitted (as signal waveforms), via the transmit antenna 519, over the communication channel 114 to the satellite 121.

Figure 6:
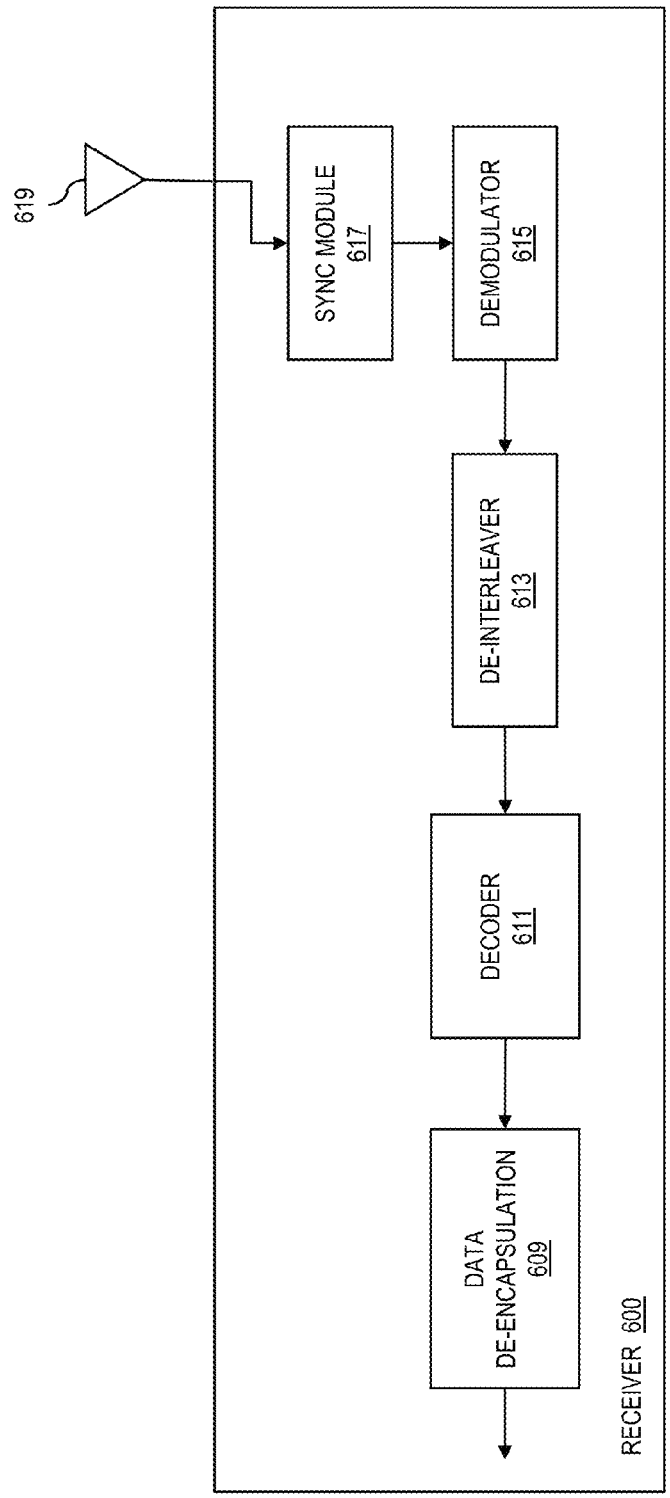
FIG. 6 illustrates a block diagram of an exemplary receiver configured to operate in the systems of FIGS. 1A and 1B, in accordance with exemplary embodiments of the present invention.

FIG. 6 illustrates a block diagram of an exemplary receiver configured to operate in the systems of FIGS. 1A and 1B, in accordance with exemplary embodiments of the present invention. With reference to FIG. 6, the receiver 600 comprises receive antenna 619, sync module 617, demodulator 615, de-interleaver 613, decoder 611 and de-encapsulation module 609. The receive antenna 619 receives the signal waveform transmitted over the channel 114 from the satellite 121. The sync module 617 detects the unique word, performs synchronization and determines the modcod and other PLS signaling of the PL Header. The demodulator 615 demodulates the received signal waveforms, based in part on the signal constellation employed for the modulation, to obtain the encoded signals. The de-interleaver 613 reorders the sequence of symbols or bits based on the predetermined manner of interleaving at the transmitter 500. The decoder 611 then decodes the de-interleaved bit sequence to generate the encapsulated message data, and the de-encapsulation module 609 de-encapsulates the message data to regenerate the original source data. For example, in accordance with the exemplary embodiments of the present invention, in the case of a lower S/N terminal, the sync module 617 detects the Low S/N UW of the PL Frames destined for such lower S/N terminals, and performs the burst mode synchronization based on the UW. Further, the sync module 617 also determines the modulation and coding scheme either based on the encoded modcod field 323 of the Low S/N Sync Header 315 (in the case of a PL frame 311, as illustrated in FIG. 3A), or based on the specific Low S/N UW detected (in the case of a PL frame 331, as illustrated in FIG. 3B).

Figure 7:
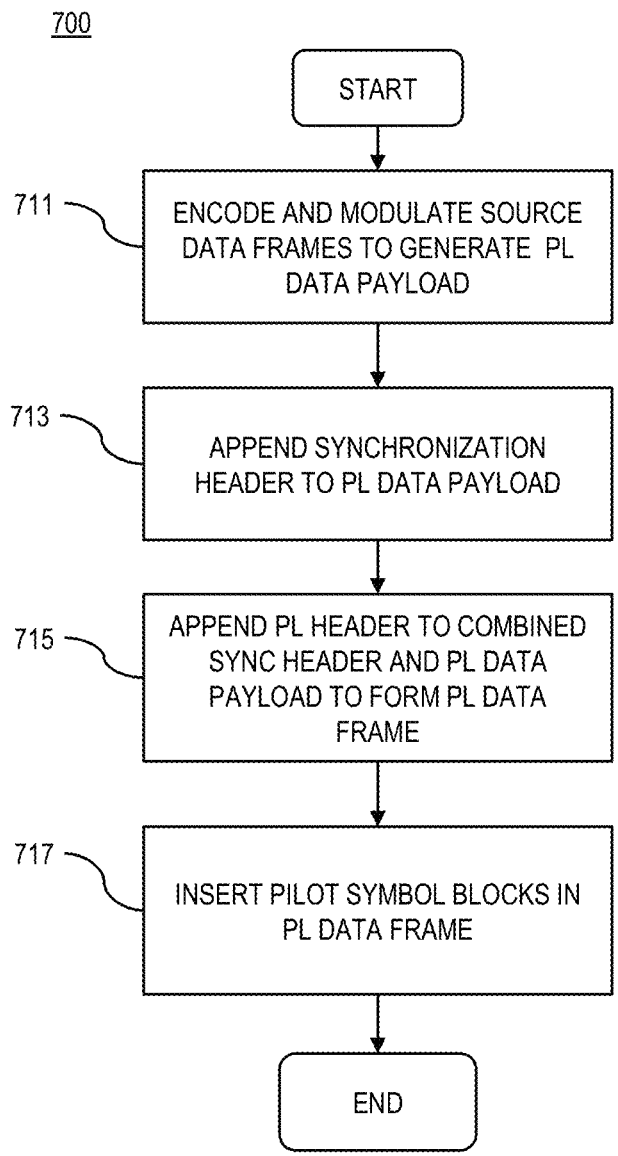
FIG. 7 illustrates a flow chart of an exemplary process for generating physical layer frames intended for lower S/N terminals, in accordance with exemplary embodiments of the present invention.

FIG. 7 illustrates a flow chart of an exemplary process for generating physical layer frames intended for lower S/N terminals, as described above, in accordance with exemplary embodiments of the present invention. For example, the process may be performed by one or more modules of a transmitter (e.g., the transmitter 500 of FIG. 5), such as the data encapsulation module 511. With reference to FIG. 7, the process for generating a physical layer (PL) data frame for transmission over a wireless communications network begins with the receipt of the source data frames. At step 711, the source data frames are encoded and modulated in accordance with a first modulation and coding (modcod) scheme selected from a first set of modcod schemes to generating the PL data payload. At step 713, a synchronization (sync) header is appended to the PL data payload, wherein the sync header comprises a one unique word (UW) of a UW set, wherein each UW of the UW set corresponds to a different respective one of the first set of modcod schemes, and the one UW of the sync header corresponds to the selected first modcod scheme. At step 715, a PL header is appended to the combined sync header and PL data payload to form the PL data frame, wherein the PL header comprises a second UW and physical layer signaling (PLS) data, wherein the PLS data comprises encoded data fields reflecting information indicating a length of the PL data frame, and wherein the data fields are encoded in accordance with a second modcod scheme selected from a second set of modcod schemes. As described above, each modcod scheme of the second set is designed for terminals of a second signal-to-noise ratio (SNR) operating range, and each modcod scheme of the first set is designed for terminals of a first SNR operating range that is relatively lower than the second SNR operating range. At step 717, a pattern of pilot symbol blocks is inserted in the PL data frame.

Figure 8:
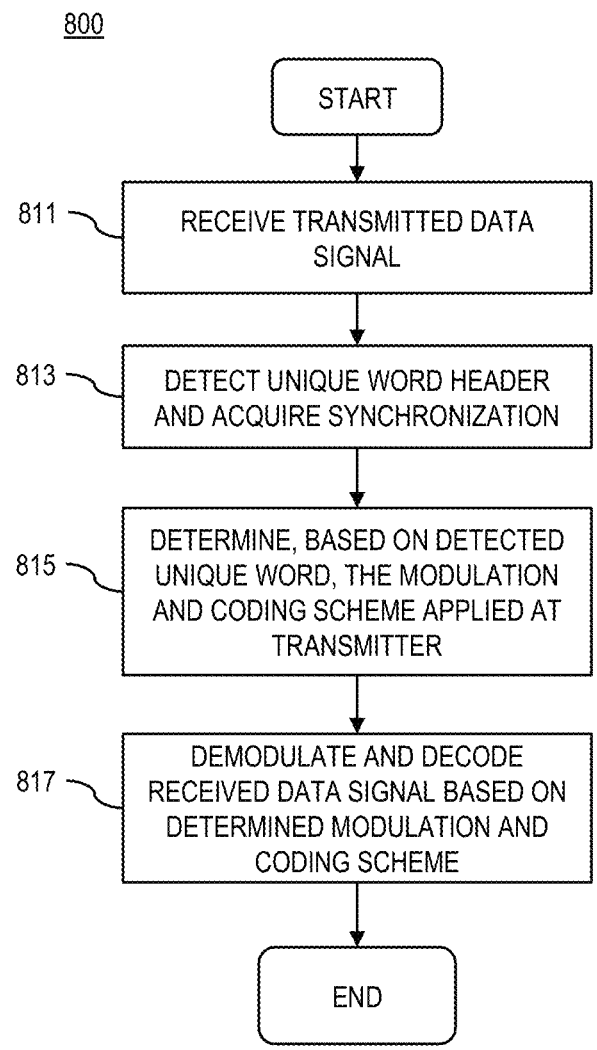
FIG. 8 illustrates a flow chart of an exemplary process for decoding physical layer frames generated based on a process for generating physical layer frames intended for lower S/N terminals, in accordance with exemplary embodiments of the present invention.

FIG. 8 illustrates a flow chart of an exemplary process for decoding physical layer frames generated based on a process for generating physical layer frames intended for lower S/N terminals, as described above, in accordance with exemplary embodiments of the present invention. For example, the process may be performed by one or more modules of a receiver (e.g., the receiver 600 of FIG. 6). With reference to FIG. 8, the process the process starts at step 811, where the data signals transmitted over the satellite channel 114 are received by the receiver 600. At step 813, the sync module 617 detects the unique word and acquires synchronization. At step 813, the modulation and coding scheme applied at the transmitter is determined based on the detected unique word. At step 817, the demodulator 615 demodulates the data signal, and the de-interleaver 613 and decoder 611, decode the data signal based on the determined modulation and coding schemes, to regenerate the original source data sequence.

Figure 9:
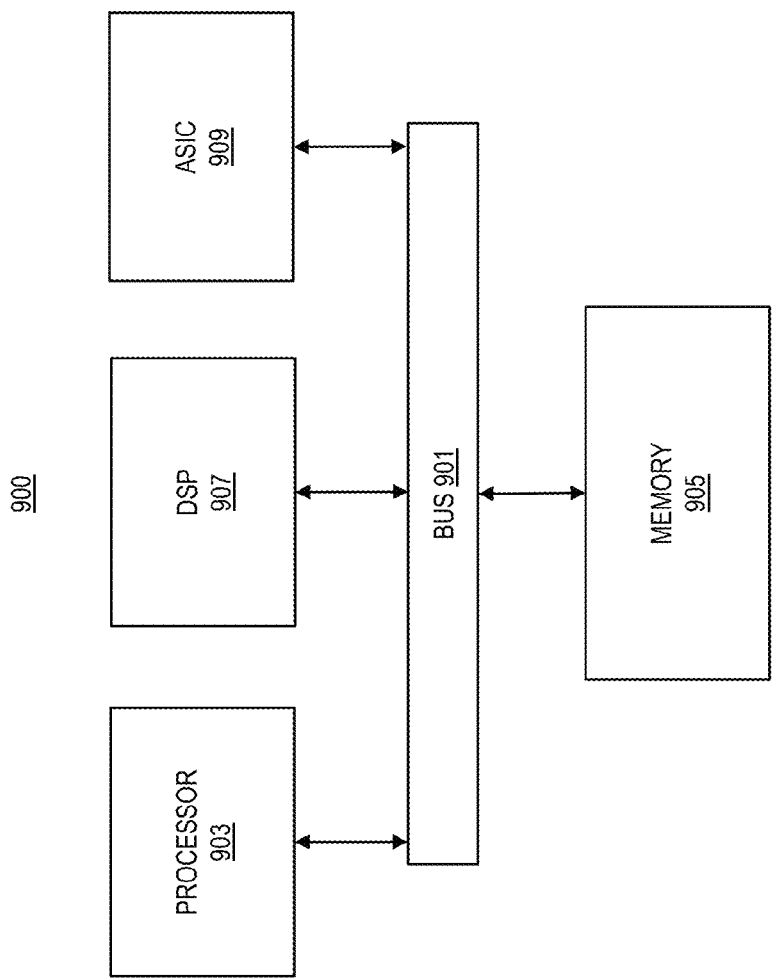
FIG. 9 illustrates a block diagram of a chip set that can be utilized in implementing communications system protocols for the support of communications services and applications over relatively low signal-to-noise ratio ($E_s/N_0$) links, according to exemplary embodiments of the present invention.

FIG. 9 illustrates a block diagram of a chip set that can be utilized in implementing communications system protocols for the support of communications services and applications over relatively low signal-to-noise ratio ($E_s/N_0$) links, according to exemplary embodiments of the present invention. With reference to FIG. 9, chip set 900 includes, for instance, processor and memory components described with respect to FIG. 5 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 900 includes a communication mechanism such as a bus 901 for passing information among the components of the chip set. A processor 903 has connectivity to the bus 901 to execute instructions and process information stored in, for example, a memory 905. The processor 903 includes one or more processing cores with each core configured to perform independently. A multi-core processor enables multiprocessing within a single physical package. Examples of a multi-core processor include two, four, eight, or greater numbers of processing cores. Alternatively or in addition, the processor 503 includes one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, and/or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 may comprise various forms of computer-readable media, e.g., including both dynamic memory (e.g., RAM) and static memory (e.g., ROM) for storing executable instructions that, when executed by the processor 903 and/or the DSP 907 and/or the ASIC 909, perform the process of exemplary embodiments as described herein. The memory 905 also stores the data associated with or generated by the execution of the process.

The term "computer-readable medium" or "computer-readable media," as used herein, refers to any medium that participates in providing instructions for execution by the processor 903, and/or one or more of the specialized components, such as the one or more digital signal processors (DSP) 907, and/or one or more application-specific integrated circuits (ASIC) 909. Such a medium may take many forms, including but not limited to non-volatile media, volatile media, and transmission media. Non-volatile media include, for example, read only memory (ROM), included within memory 905. Volatile media, for example, may include dynamic random access memory (RAM), included within memory 905. Transmission media may include copper or other conductive wiring, fiber optics, or other physical transmission media, including the wires and/or optical fiber that comprise bus 901. Transmission media can also take the form of wireless data signals, such as those generated during radio frequency (RF) and infrared (IR) data communications. Common forms of computer-readable media include, for example, magnetic storage media (e.g., magnetic hard disks or any other magnetic storage medium), solid state or semiconductor storage media (e.g., RAM, PROM, EPROM, FLASH EPROM, a data storage device that uses integrated circuit assemblies as memory to store data persistently, or any other storage memory chip or module), optical storage media (e.g., CD ROM, CDRW, DVD, or any other optical storage medium), a or any other medium for storing data from which a computer or processor can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Moreover, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various exemplary embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention.

While exemplary embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method for generating a physical layer (PL) data frame for transmission over a wireless communications network, the method comprising:
    generating a PL data payload by encoding and modulating one or more source data frames in accordance with a first modulation and coding (modcod) scheme selected from a first set of modcod schemes;
    appending a synchronization (sync) header to the PL data payload, wherein the sync header comprises a first unique word (UW), and a modcod field that indicates the first modcod scheme; and
    appending a PL header to the combined sync header and PL data payload to form the PL data frame, wherein the PL header comprises a second UW and physical layer signaling (PLS) data, wherein the PLS data comprises encoded data fields reflecting information indicating a length of the PL data frame, and wherein the data fields are encoded in accordance with a second modcod scheme selected from a second set of modcod schemes;
    wherein each modcod scheme of the second set is designed for terminals of a second signal-to-noise ratio (SNR) operating range, and each modcod scheme of the first set is designed for terminals of a first SNR operating range that is relatively lower than the second SNR operating range.

2. The method of claim 1, wherein the first SNR operating range comprises an upper end at an $E_s/N_0$ value less than or equal to approximately −3 dB, and the second SNR operating range comprises a lower end at an $E_s/N_0$ value greater than approximately −3 dB.

3. The method of claim 1, wherein the modcod schemes of the first set are designed for encoding data intended for transmission over a channel of the wireless communications network to the terminals of the first SNR operating range, to enable reliable decoding of the transmitted data by the terminals of the first SNR operating range, wherein the first SNR operating range comprises an upper end at an $E_s/N_0$ value less than or equal to approximately −3 dB.

4. The method of claim 1, wherein the first UW comprises a unique word designed to facilitate efficient and reliable detection by the terminals of the first SNR operating range.

5. The method of claim 4, wherein the first SNR operating range comprises an upper end at an $E_s/N_0$ value less than or equal to approximately −3 dB.

6. The method of claim 1, wherein the PL header and the PL data frame are compatible with framing structure, channel coding and modulation systems of the DVB-S2 standard, and one or more of the modcod schemes of the second set are compatible with one or more respective modcod schemes of the DVB-S2 standard.

7. The method of claim 1, further comprising:
inserting a first pattern of pilot symbol blocks in the PL data frame; and
inserting one or more additional patterns of pilot symbol blocks, wherein each pilot symbol block of the additional pattern(s) are of a same length as the pilot symbol blocks of the first pattern, and the blocks of the additional pattern(s) are interspersed between the block of the first pattern; and
wherein the one or more additional patterns of pilot symbol blocks are inserted to facilitate improved synchronization with respect to PL frames intended for the terminals of the first SNR operating range.

8. An apparatus for generating a physical layer (PL) data frame for transmission over a wireless communications network, comprising:
at least one processor; and
at least one memory including computer program code for one or more programs,
the at least one memory and the computer program code configured to, with the at least one processor, cause the apparatus to perform at least the following,
generating a PL data payload by encoding and modulating one or more source data frames in accordance with a first modulation and coding (modcod) scheme selected from a first set of modcod schemes;
appending a synchronization (sync) header to the PL data payload, wherein the sync header comprises a first unique word (UW), and a modcod field that indicates the first modcod scheme; and
appending a PL header to the combined sync header and PL data payload to form the PL data frame, wherein the PL header comprises a second UW and physical layer signaling (PLS) data, wherein the PLS data comprises encoded data fields reflecting information indicating a length of the PL data frame, and wherein the data fields are encoded in accordance with a second modcod scheme selected from a second set of modcod schemes;
wherein each modcod scheme of the second set is designed for terminals of a second signal-to-noise ratio (SNR) operating range, and each modcod scheme of the first set is designed for terminals of a first SNR operating range that is relatively lower than the second SNR operating range.

9. The apparatus of claim 8, wherein the first SNR operating range comprises an upper end at an $E_s/N_0$ value less than or equal to approximately −3 dB, and the second SNR operating range comprises a lower end at an $E_s/N_0$ value greater than approximately −3 dB.

10. The apparatus of claim 8, wherein the modcod schemes of the first set are designed for encoding data intended for transmission over a channel of the wireless communications network to the terminals of the first SNR operating range, to enable reliable decoding of the transmitted data by the terminals of the first SNR operating range, wherein the first SNR operating range comprises an upper end at an $E_s/N_0$ value less than or equal to approximately −3 dB.

11. The apparatus of claim 8, wherein the first UW comprises a unique word designed to facilitate efficient and reliable detection by the terminals of the first SNR operating range.

12. The apparatus of claim 11, wherein the first SNR operating range comprises an upper end at an $E_s/N_0$ value less than or equal to approximately −3 dB.

13. The apparatus of claim 8, wherein the PL header and the PL data frame are compatible with framing structure, channel coding and modulation systems of the DVB-S2 standard, and one or more of the modcod schemes of the second set are compatible with one or more respective modcod schemes of the DVB-S2 standard.

14. The apparatus of claim 8, wherein the apparatus is caused to further perform the following:
inserting a first pattern of pilot symbol blocks in the PL data frame; and
inserting one or more additional patterns of pilot symbol blocks, wherein each pilot symbol block of the additional pattern(s) are of a same length as the pilot symbol blocks of the first pattern, and the blocks of the additional pattern(s) are interspersed between the block of the first pattern; and
wherein the one or more additional patterns of pilot symbol blocks are inserted to facilitate improved synchronization with respect to PL frames intended for the terminals of the first SNR operating range.

15. A method for generating a physical layer (PL) data frame for transmission over a wireless communications network, the method comprising:
generating a PL data payload by encoding and modulating one or more source data frames in accordance with a first modulation and coding (modcod) scheme selected from a first set of modcod schemes;
appending a synchronization (sync) header to the PL data payload, wherein the sync header comprises either (a) a one unique word (UW) of a UW set, wherein each UW of the UW set corresponds to a different respective one of the first set of modcod schemes, and the one UW of the sync header corresponds to the selected first modcod scheme, or (b) a first unique word (UW) and a modcod field that indicates the first modcod scheme; and
appending a PL header to the combined sync header and PL data payload to form the PL data frame, wherein the PL header comprises a second UW and physical layer signaling (PLS) data, wherein the PLS data comprises encoded data fields reflecting information indicating a length of the PL data frame, and wherein the data fields are encoded in accordance with a second modcod scheme selected from a second set of modcod schemes;
wherein each modcod scheme of the second set is designed for terminals of a second signal-to-noise ratio (SNR) operating range, and each modcod scheme of the first set is designed for terminals of a first SNR operating range that is relatively lower than the second SNR operating range.

16. The method of claim 15, wherein the first SNR operating range comprises an upper end at an $E_s/N_0$ value less than or equal to approximately −3 dB, and the second SNR operating range comprises a lower end at an $E_s/N_0$ value greater than approximately −3 dB.

17. The method of claim 15, wherein the modcod schemes of the first set are designed for encoding data intended for transmission over a channel of the wireless communications network to the terminals of the first SNR operating range, to enable reliable decoding of the transmitted data by the terminals of the first SNR operating range, wherein the first SNR operating range comprises an upper end at an $E_s/N_0$ value less than or equal to approximately −3 dB.

18. The method of claim 15, wherein, when the UW set is employed, the UW set comprises a structured set of unique words designed to facilitate efficient and reliable detection by the terminals of the first SNR operating range, and wherein, when the first UW is employed, the first UW comprises a unique word designed to facilitate efficient and reliable detection by the terminals of the first SNR operating range.

19. The method of claim 18, wherein the first SNR operating range comprises an upper end at an $E_s/N_0$ value less than or equal to approximately −3 dB.

20. The method of claim 15, further comprising:
inserting a first pattern of pilot symbol blocks in the PL data frame; and
inserting one or more additional patterns of pilot symbol blocks, wherein each pilot symbol block of the additional pattern(s) are of a same length as the pilot symbol blocks of the first pattern, and the blocks of the additional pattern(s) are interspersed between the block of the first pattern; and
wherein the one or more additional patterns of pilot symbol blocks are inserted to facilitate improved synchronization with respect to PL frames intended for the terminals of the first SNR operating range.

* * * * *